Jan. 19, 1943.　　　G. A. LYON　　　2,308,616
WHEEL STRUCTURE
Filed Nov. 25, 1940　　　2 Sheets-Sheet 1
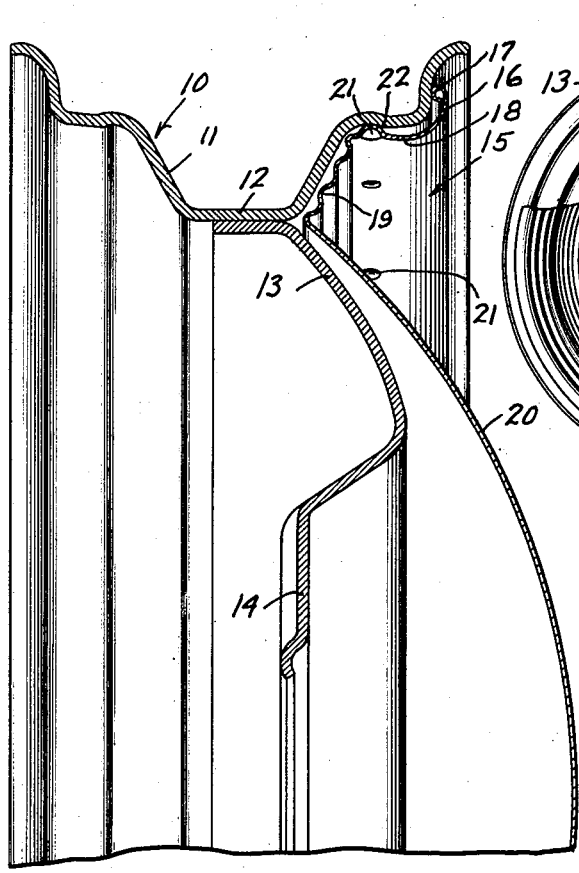
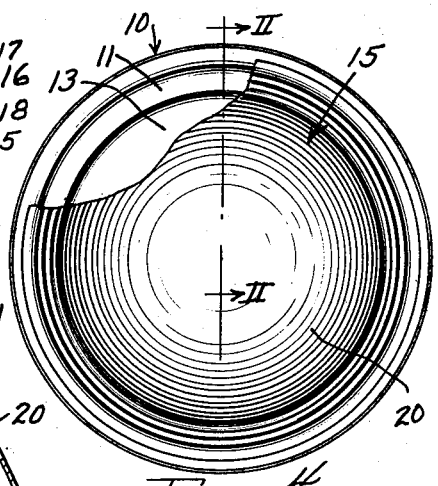
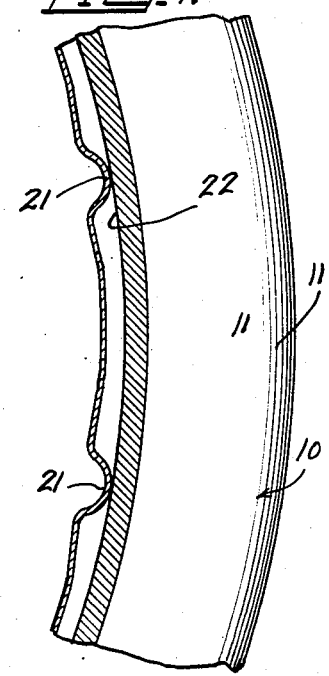
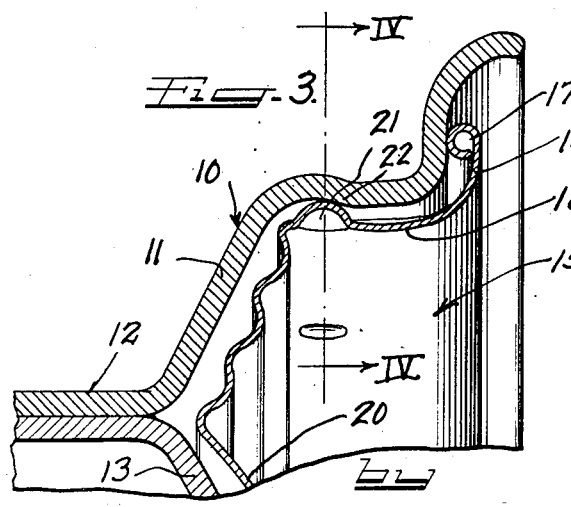
George Albert Lyon.

Jan. 19, 1943. G. A. LYON 2,308,616
WHEEL STRUCTURE
Filed Nov. 25, 1940 2 Sheets—Sheet 2
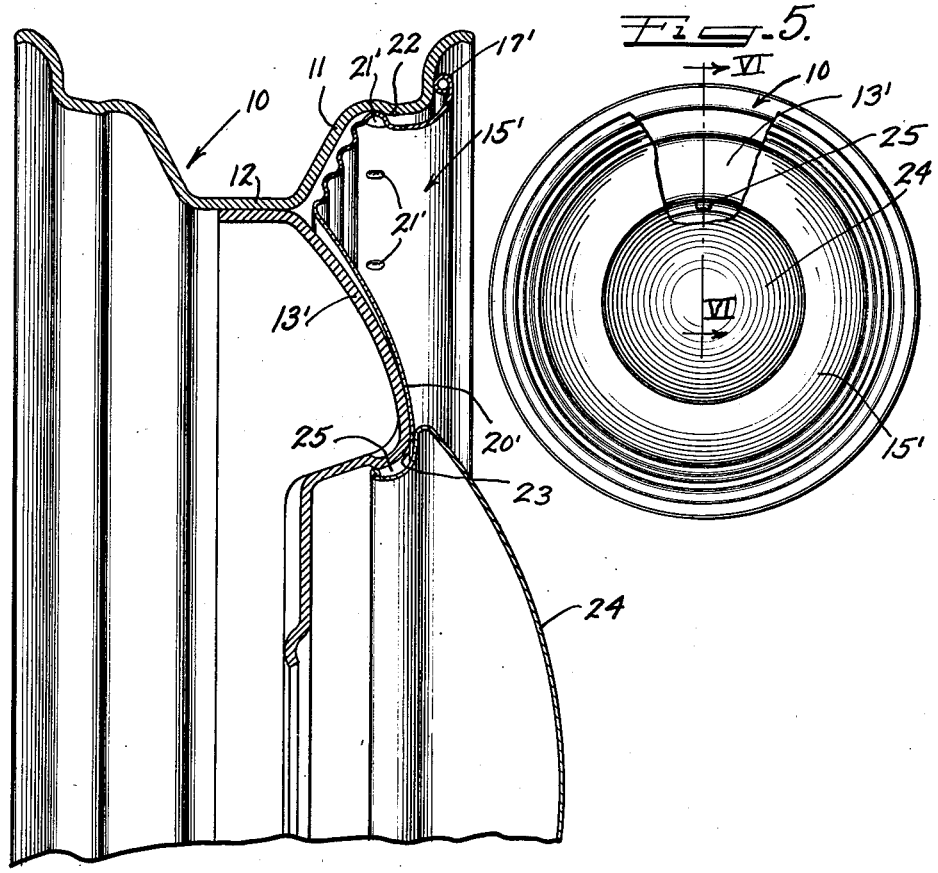
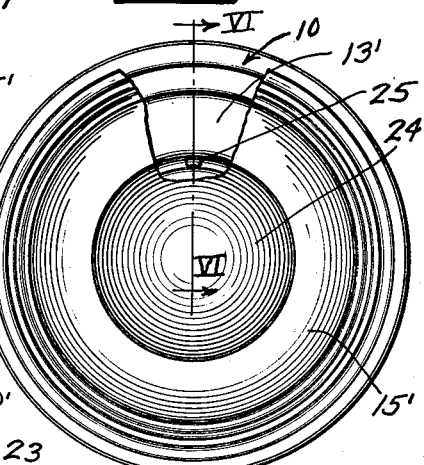
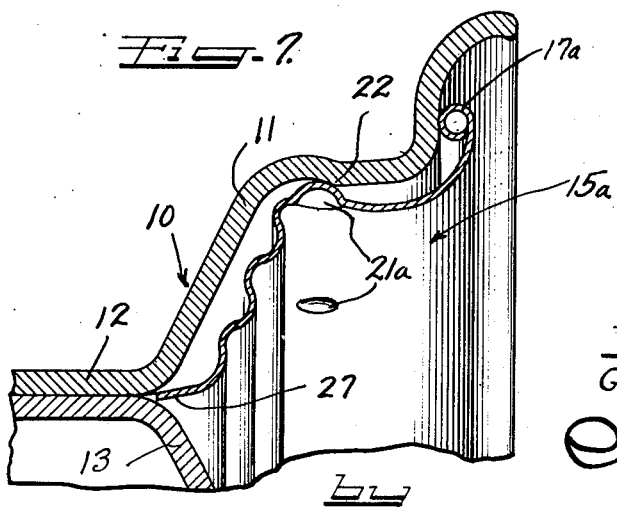
Inventor
GEORGE ALBERT LYON.

Patented Jan. 19, 1943

2,308,616

UNITED STATES PATENT OFFICE 2,308,616

WHEEL STRUCTURE

George Albert Lyon, Allenhurst, N. J.

Application November 25, 1940, Serial No. 366,969

12 Claims. (Cl. 301—37)

This invention relates to wheel structures, and more particularly to a cover member either in the form of a solid disk or an annulus provided with means for a resilient snap-on cooperation with the tire rim of the wheel.

An object of this invention is to provide an improved and simplified structure for detachably springing a cover member into retaining cooperation with a shoulder provided by a tire bead abutment in the wheel tire rim.

Another object of this invention is to provide retaining means for a cover member which is adapted for use with cover members either in the form of a solid disk or in the form of an annulus depending upon the extent of wheel coverage desired.

Still another object of this invention is to provide a cover member which lends itself readily to decoration and which may be ornamented in keeping with the appointments of an automotive vehicle.

In accordance with the general features of this invention, there is provided a circular cover member including an outer portion arranged to extend generally in an axial direction and provided with a plurality of spaced resilient indentations, which define bumps projecting outwardly from the portion, and which are adapted to be sprung over a rigid tire bead shoulder on the tire rim for the purpose of holding the cover member on the wheel.

Other objects and features of this invention will more fully appear from the following detailed description taken in connection with the accompanying drawings which illustrate several embodiments thereof, and in which:

Figure 1 is a side elevation of the structure embodying the features of this invention and partly broken away to show the side elevation of the wheel;

Figure 2 is an enlarged fragmentary cross sectional view taken on the line II—II of Figure 1 looking in the direction indicated by the arrows;

Figure 3 is an enlarged fragmentary sectional view corresponding to the upper right hand portion of Figure 2 and illustrating in detail how the retaining bumps of my novel wheel cover retainingly cooperate with a rigid shoulder on the tire rim;

Figure 4 is a fragmentary sectional view taken on the line IV—IV of Figure 3 looking in the direction indicated by the arrows and showing the spacing of the bumps and their relative arrangement with reference to the shoulder on the rim;

Figure 5 is a side elevation of a modification of the invention partly broken away to show the side elevation of the wheel;

Figure 6 is an enlarged fragmentary cross sectional view taken on the line VI—VI of Figure 5 looking in the direction indicated by the arrows and showing the two-part construction of the wheel cover; and Figure 7 is a fragmentary sectional view corresponding to the upper right hand portion of Figure 6 but illustrating a modification of the invention wherein the wheel cover is in the form of an annulus disposed only over the flanges of the tire rim.

As shown on the drawings:

The reference character 10 designates generally a drop center type of tire rim including the usual stepped flanges or shoulders 11 and a base flange 12 fastened in any suitable manner to the wheel body or spider 13 which is of a generally bulged and convex cross sectional shape. The wheel spider 13 terminates at its center in the usual wheel fastening flange 14 by means of which the wheel may be bolted in position on the axle of a vehicle.

Cooperable with the outer or exposed side surfaces of the wheel is a wheel cover member 15 embodying the features of this invention and which in this form of the invention is illustrated as being a substantially solid disk. This cover 15 includes a radially outwardly turned marginal portion 16 terminating in a beaded edge 17 disposed in close proximity to or contiguous with the side flange 11 of the tire rim 10. Inwardly of the marginal portion 16, the member 15 has a generally axially extending part or portion 18 which is connected to an inclined and corrugated portion 19 disposed between the portion 18 and the crown part 20 of the cover member 15. The corrugated portion 19 is necessarily resilient by reason of its corrugations and is disposed in covering relation along a side flange 11 of the tire rim and terminates at the junction of the tire rim and body part. On the other hand, the crown part or portion 20 of the cover is of a convex-concave construction and is bulged axially outwardly over the wheel spider 13 for the purpose of concealing the wheel spider.

This cover member, as well as the cover members in the forms of my invention to be described hereinafter may be made from any suitable sheet material but is preferably formed from thin metallic sheet material, such, for example, as material of .020" thickness. I have in manufacturing wheel disks and rings obtained excellent results by using stainless steel or 18–8 steel.

The generally axially extending portion 18 of the cover member 15 is provided with a plurality of spaced indentations or bumps 21 which project radially outwardly for cooperation with a tire bead abutment or shoulder 22 on an axially extending flange 11 of the tire rim 10. The outer extremities of these bumps or protuberances 21 are disposed in a common circle which has a diameter slightly greater than the innermost diameter of the shoulder 22 over which the bumps are resiliently pressed or sprung when the cover member is pressed home into retaining cooperation with the tire rim.

It will be appreciated that in the application of the cover to the wheel it is first disposed over the outer side of the wheel and is then pressed axially toward the body of the wheel. During this application of the cover member, the bumps or indentations 21 are necessarily deflected by reason of the resiliency of the material at these points, so that these bumps can pass over the high spot of the shoulder 22 to a position to the rear of the shoulder. In other words, the bumps are deflected over and behind the shoulder into resilient retaining cooperation therewith for the purpose of holding the cover member on the wheel. When in this retaining position, the bumps have only partially returned to their normal positions; so they are hence under tension.

The cover member may be easily detached from the wheel by inserting a pry-off tool under the beaded edge 17 and forcibly prying the cover member loose from the wheel.

In Figures 5 and 6 I have illustrated a modification of the invention wherein the cover member instead of being in the form of a solid disk is in the form of an annulus 15' having a beaded edge 17'. This annulus 15' includes spaced bumps 21' for cooperation with a shoulder 22 on a side flange 11 of the tire rim 10. The cooperation of these bumps with the shoulder is the same as in the previously described form of the invention.

The tire rim 10 is connected to a slightly modified form of wheel body or spider 13', which has a plurality of protuberances 25 arranged in a common circle for retaining cooperation with a hub cap 24. The annulus 15' includes a central spider covering portion 20', which has an edge 23 terminating under the peripheral margin of the hub cap 24 when the hub cap is in retaining cooperation with the bumps 25.

In this form of the invention, the annulus 15' is first pressed into retaining cooperation with the tire rim 10, and thereafter the hub cap 24 is pressed home into retaining cooperation with the protuberances 25 in which position it will overlap and engage the inner edge 23 of the annulus 15 so as to clamp this edge to the wheel spider.

The hub cap 24 per se does not constitute part of this invention, since it is covered in previously issued Letters Patent granted to me. It should be noted, however, that the hub cap has a flexible skirt which is adapted to be sprung over and into retained cooperation with the bumps 25.

Thus, it will be appreciated that in this form of the invention the principal difference between it and the first described form resides in the fact that the cover member is in the form of an annulus, and as a consequence the central hub cap is necessary in order to provide complete coverage for the outer side of the wheel.

In Figure 7, I have illustrated still a third form of the invention which differs principally from the other described forms of the invention in that the wheel cover member 15a comprises only a ring which is disposed only over side flanges 11 of the tire rim 10. This ring 15a has a plurality of spaced bumps 21a for cooperation with the shoulder 22 on the tire rim flange 11 in the same manner as in the other described forms of the invention.

The inner edge of the annulus 15a terminates at 27 in an inwardly turned edge located in the junction of the base flange 12 of the tire rim and the body part 13. It will, of course, be appreciated that if the beaded outer edge 17a of the annulus 15a contacts the side flange of the tire rim, then the inner edge 27 of the annulus should preferably not contact the wheel but should extend in the crack between the base flange 12 and the body part 13.

It will also be observed that in all forms of my invention I utilize the rim shoulder abutment in the retaining of the wheel cover on the wheel. This shoulder is one of two provided in the rim flanges to prevent slipping or sliding of the tire bead toward the base flange of the rim. Without such shoulders there is a marked tendency of the beads sliding transversely toward the rim base flange when the tire is punctured and thereby occasioning damage to or excessive wear of the tire. Thus these shoulders are employed for a dual function in my novel wheel construction.

I claim as my invention:

1. In a wheel structure, a wheel including a multi-flanged and shouldered tire rim and a body part connected thereto, a cover member for snap on retaining cooperation with a shoulder of the wheel rim comprising a circular member having a central disk-like portion terminating in an outer portion extending generally axially from said disk-like portion and then radially outwardly, said generally extending axial portion being provided with a plurality of spaced indentations forming resilient bumps adapted to be sprung over and into retaining engagement with the shoulder of the wheel rim.

2. In a wheel structure, a wheel including a multi-flanged and shouldered tire rim and body part connected thereto, a cover member for snap on retaining cooperation with a shoulder of the wheel rim comprising a circular member having a central disk-like portion terminating in an outer portion extending generally axially from said disk-like portion and then radially outwardly, said generally extending axial portion being provided with a plurality of spaced indentations forming resilient bumps adapted to be sprung over and into retaining engagement with the shoulder of the wheel rim, said shoulder of the wheel rim being annular and defining one side of a tire bead seat.

3. In a wheel structure, a wheel including a multi-flanged and shouldered tire rim and body part connected thereto, a cover member for snap on retaining cooperation with a shoulder of the wheel rim comprising a circular central member having an outer portion extending generally axially and then radially outwardly, said generally extending axial portion being provided with a plurality of spaced indentations forming resilient bumps adjacent the rear side of said axial portion and adapted to be sprung over and into retaining engagement with the shoulder of the wheel rim, the outer extremities of said bumps being disposed in a common circle of a diameter slightly greater than the diameter of said shoulder so as to require flexing of the cover member at said bumps in order for the bumps to pass over and behind said shoulder, said rear side of said axial portion being supported by said central member.

4. In a wheel structure including a wheel having a multi-flanged and shouldered tire rim as well as a body part, a wheel disk for disposition over an outer side of a wheel including a central crown portion and an outer marginal portion having an axially extending part and a radially extending part, said axially extending part having a plurality of outwardly projecting indentations disposed in a common circle but spaced from each other and arranged to be sprung over and behind a shoulder of said tire rim for retaining the disk on the wheel, said crown portion including a generally radially outwardly extending portion terminating in said axially extending part at said indentations.

5. In a wheel structure including a wheel having a multi-flanged and shouldered tire rim as well as a wheel body, an annular cover member including a body covering portion and an outer portion for disposition over the side flanges of the tire rim, said outer portion being provided with spaced radially extending bumps disposed substantially midway between the outer edge of the cover member and said body covering portion, said bumps being disposed in a common circle of a diameter such as to require flexing of the cover member at said bumps in order for the bumps to pass over and behind a shoulder on an axially extending flange of said tire rim for retaining the cover member on a wheel, said body portion extending substantially radially outward to said outer portion but having a junction therewith adjacent said bumps.

6. In a wheel structure, a wheel including a multi-flanged and shouldered tire rim and a body part connected thereto, a cover member for snap on retaining cooperation with a shoulder of the wheel rim comprising a circular member having an outer portion extending generally axially and then radially outwardly, said generally extending axial portion being provided with a plurality of spaced indentations forming resilient bumps adapted to be sprung over and into retaining engagement with the shoulder of the wheel rim, said cover member also including a corrugated portion radially inward of said bumps and terminating adjacent the junction of the tire rim and wheel body, said corrugated portion directly supporting but being at a substantial angle to said axial portion.

7. In a wheel structure, a wheel including a multi-flanged and shouldered tire rim and a body part connected thereto, a cover member for snap on retaining cooperation with a shoulder of the wheel rim comprising a circular member having a central disk-like portion terminating in an outer portion extending generally axially from said disk-like portion and then radially outwardly, said generally extending axial portion being provided with a plurality of spaced indentations forming resilient bumps adapted to be sprung over and into retaining engagement with the shoulder of the wheel rim said resilient bumps being located to be disposed behind said shoulder and between spaced generally radial side flanges of said rim.

8. In a wheel structure, a wheel including a multi-flanged and shouldered tire rim and a body part connected thereto, a cover member for snap-on retaining cooperation with a shoulder of the wheel rim comprising a circular member having a central disk-like portion terminating in an outer portion extending generally axially from said disk-like portion and then radially outwardly, said generally extending axial portion being provided with a plurality of spaced indentations forming resilient bumps adapted to be sprung over and into retaining engagement with the shoulder of the wheel rim, said cover member also including a resilient corrugated portion radially inward of said bumps and terminating adjacent the junction of the tire rim and wheel body with said bumps located in close proximity to the resilient corrugated portion.

9. In a wheel structure, a wheel including a drop center type tire rim having in one of its axial flanges an annular groove opening radially inwardly and the bottom of which extends radially outwardly and a circular wheel cover member having a portion extending over said axial flange and a portion extending therefrom toward the axis of the wheel, said cover member being provided at the junction of said portions with an annular intermediate section flexable into said groove so as to bottom therein under tension and retain said cover member on the wheel.

10. As an article of manufacture, a wheel cover for retaining cooperation with a flanged and shouldered tire rim, said cover comprising a circular member having spaced integral portions flexible to be sprung over and into cover retaining engagement with a shoulder on said tire rim, said portions being in a transversely intermediate section of the cover bounded on one side by a curved outer marginal edge portion and on the other by an axially inwardly extending portion.

11. In a wheel structure, a wheel including a drop center type tire rim having in one of its axial flanges an annular groove opening radially inwardly and the bottom of which extends radially outwardly and a circular wheel cover member having a portion extending over said axial flange and a portion extending therefrom toward the axis of the wheel, said cover member being provided at the junction of said portions with an annular intermediate section flexible into said groove so as to bottom therein under tension and retain said cover member on the wheel, said flexible section including a plurality of spaced depressions each of a configuration corresponding to the bottom of said groove so as to nest snugly in said groove.

12. As an article of manufacture, a wheel cover having an outer marginal portion connected to a radially inward intermediate portion provided with an axially extending continuous annular cover retaining flange, said flange being bulged radially outwardly and formed into spaced flexible curved portions adapted to bottom and nest in an annular groove on a wheel rim flange, said portions having their curved outermost extermities lying in a common circle of a diameter such as to require a radial inward flexing of said portions in order for them to be nested in the groove of the wheel rim, and whereby they are stressed to exert a cover retaining pressure against the wheel.

GEORGE ALBERT LYON.